Oct. 31, 1939.  G. E. HOWARD  2,178,520
METHOD OF TEMPERING GLASS
Filed July 1, 1936

Witness:
A. A. Horn

Inventor:
George E. Howard
by Brown & Parham
Attorneys.

Patented Oct. 31, 1939

2,178,520

UNITED STATES PATENT OFFICE 2,178,520

METHOD OF TEMPERING GLASS

George E. Howard, Butler, Pa., assignor to Hartford-Empire Company, Hartford, Conn., a corporation of Delaware Application July 1, 1936, Serial No. 88,278

5 Claims. (Cl. 49—89)

This invention relates to methods of tempering or case-hardening glass sheets. Its general object is to provide a novel method whereby the temperature conditions which determine the degree and distribution of strain may be better controlled than in prior methods and an improved product thus obtained.

In the usual method of case-hardening, a glass sheet is heated in a suitable furnace to a temperature just short of, or approximating, the softening point, after which it is withdrawn and rapidly cooled, usually by air under pressure delivered in jets against both sides of the sheet.

The effect of this forced cooling is to produce a marked temperature differential between the interior and the surface portions of the glass, with the result that the hot interior glass is prevented from contracting when it cools by the stiffening of the cooler surface portions, which produces tension in the interior glass and compression in the surface portions of the sheet. This strained condition of case-hardened glass is what makes it so strong and resistant to impact.

It is to be expected that the more uniform the strain in tempered glass, the stronger the glass, and the more uniform the strain which can be introduced, the higher the degree of strain and the stronger the glass. But most tempered glass is strained very unevenly. The conditions causing such strain are far from ideal. The sheets are not usually heated uniformly throughout, which prevents even cooling, nor is the forced cooling uniform.

Although it is possible to heat the glass to a uniform temperature throughout, the control of heating which is possible is seldom obtained, or even sought, in practice for various reasons, mainly expense. In regard to cooling, there is very little control of the differential temperature so essential to case-hardening, because the instant the glass is removed from the furnace, it starts to cool very quickly, and often unevenly; and this initiates non-uniform temperature differentials in the glass which are accentuated by the forced cooling Various attempts have been made to control the forced cooling which follows, as for example by adjusting the air pressure or varying the distribution of the air, but even so, the intensity of strain varies greatly both as to depth and distribution over the sheet, as revealed by the polariscope. This is partly due to the kind of devices used in cooling and partly to the fact that there is no control over the cooling which, in the case of thinner glass, is so rapid that there is very little time in which to establish the required temperature differential. Sometimes it is necessary to blast the glass with air while the glass is still hot in order to set up the temperature differential before the glass gets too cool; and this results in deformation of the glass.

The general object of this invention is to provide a novel method of tempering glass wherein the glass is heated internally and the temperature differential in the sheet thereby controlled or modified to produce a more uniform condition of strain and greater strength in the glass. Generally, this heating is utilized to reduce the variations in depth of cooling, or to introduce additional temperature differential to obtain more uniform strain and stronger glass.

A more specific object of the invention is to provide a novel method of tempering glass wherein the temperature differential and hence the strain are controlled by the generation of heat in the interior portion of the glass sheet by electrical means. Glass at the temperature at which tempering is started is hot enough to be a fairly good conductor of electricity; and therefore, the glass can be heated by electricity, as for example by inserting it as resistance in a suitable electric circuit. That is another object of this invention.

Other objects and advantages of the invention will be pointed out in the detailed description which follows, or will be apparent therefrom, this description having reference to the accompanying drawing illustrating one mode of carrying out my novel method, and wherein, Figure 1 is a view in front elevation of a sheet being subjected to the tempering operation;

Figs. 3 and 4 are enlarged views in horizontal section of two known types of air cooling devices.

Figure 1:
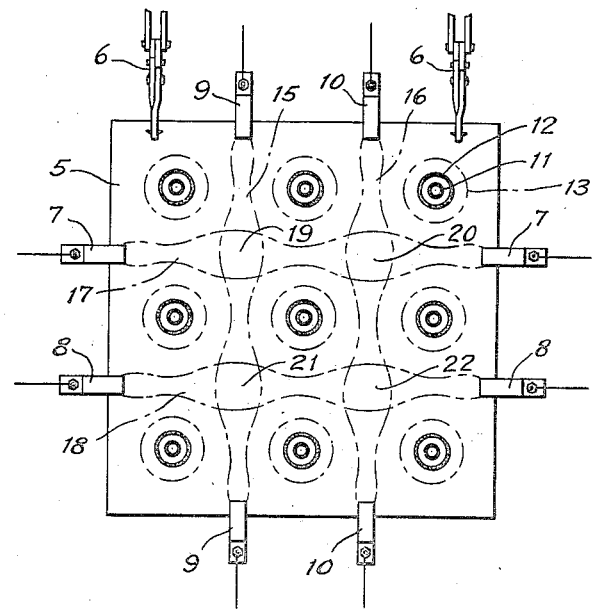
Figure 2:
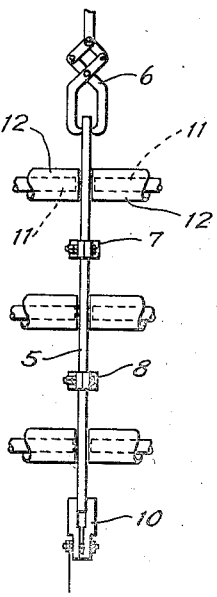
Fig. 2 is a view in end elevation of the sheet shown in Fig. 1.
Figure 2:
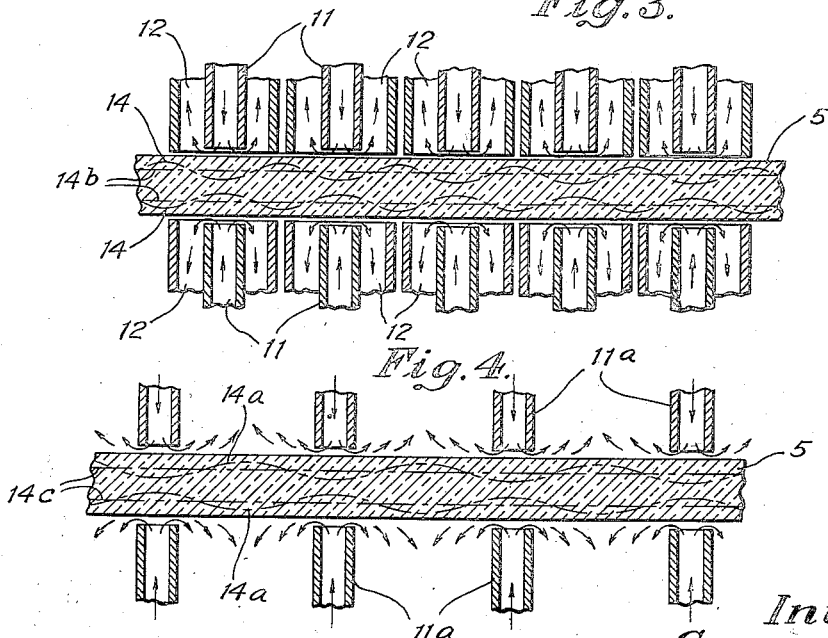

Referring in detail to the drawing, a glass sheet, which previously has been heated to the proper temperature for case-hardening (approximately the softening temperature) is shown at 5, suspended from tongs 6 in the usual manner.

For the purpose of further supplying heat to the sheet, there are connected to the edges of the sheet pairs of contacts or electrodes of suitable known type and shown conventionally at 7—7, 8—8, 9—9 and 10—10. Each pair of contacts is connected to a suitable source of current (not shown), preferably alternating current. These contacts may be attached before or after the initial heating of the sheet in the furnace (not shown) in preparation for the tempering, or any other suitable means for making the desired electrical connections may be provided. For example, the contacts may constitute clamps in a frame (not shown) for carrying the sheet.

The arrangement of the contacts shown in Fig. 1 is in accordance with the positions occupied by opposed equally spaced air nozzles 11, being such that the path of an electric current through a given pair of contacts will pass through the sheet between two rows of nozzles. It will be understood that this special arrangement is shown for purposes of illustration only; and the invention is not limited thereto.

To insure a localized cooling, each nozzle 11 is surrounded by an eduction or vacuum pipe 12 which prevents turbulence of air in an uncontrolled manner over the sheet. Thus the cooling effect of each nozzle will be well within a circle, such as is shown at 13. These nozzles are shown in Fig. 1 spaced much more widely apart than in practice, for clarity in illustration. As shown in Fig. 3, the nozzles 11 and pipes 12 may be grouped quite closely, whereas nozzles without suction pipes, such as nozzles 11a, Fig. 4, should, if so employed, be more widely spaced to avoid overlapping of air currents or turbulence (indicated by the arrows) and thus prevent exceptionally uneven cooling of the sheet.

From what has been previously said, it will be understood that the glass sheet 5, previously heated, is cooled externally both by natural radiation and by air from the nozzles 11. Temperature differentials may exist because of uneven heating, uneven cooling by natural radiation beginning when the sheet is withdrawn from the furnace, and (principally) by the localized cooling effect of nozzles 11. The electric current may be applied before withdrawal from the furnace to make the heating more uniform, or it may be applied after withdrawal to maintain the temperature of the entire sheet. But after definite temperature differentials are established and the current turned on, the current will flow mainly in the interior of the sheet, because the surface portions will be cooler and hence of lower conductivity than the interior. For the same reason, the current will flow between and around, rather than through, the chilled areas produced by the nozzles, as indicated by the paths 15, 16, 17 and 18, Fig. 1.

The flow of current in paths as described heats the interior of the glass and generally increases or serves to maintain the temperature differential more or less independently of the rate of cooling. Also, at certain points between opposed chilled areas where the main path of the current therebetween is reduced in cross section, the resistance to the passage of the current will be increased and consequently more localized heating will then occur, tending to counteract the non-uniform depth of cooling and produce more uniform strain.

Thus, as illustrated in Figs. 3 and 4, the forced air cooling may be visualized as producing humps and hollows, as indicated by the wavy lines 14—14 and 14a—14a respectively, because the intensity of cooling is so much greater just opposite the nozzles 11 or 11a. As the opposed humps approach each other, constrictions in the hotter glass increase the resistance of the path at the localized areas and hence increase the temperature in those areas tending to smooth out the humps. Conversely, there is relatively less heating in the opposed hollows. Therefore, the internal heating will so control or modify the temperature differential as to make it become more uniform, and to make it tend toward the maximum uniformity, as indicated by lines 14b—14b and 14c—14c.

It will be understood that the lines 14—14 and 14a—14a are purely imaginary, there being no critical point in the temperature gradient through the glass, as is the case with metals. But such lines may be thought of as representing average temperatures in a somewhat exaggerated manner, thus serving to illustrate very well the effects and advantages of the novel method of this invention.

With certain types and thicknesses of glass, it is unnecessary to employ forced cooling because natural radiation in conjunction with the internal heating will serve to establish and maintain a sufficient temperature differential until the glass as a whole has cooled enough to incorporate the desired permanent strain therein (tension in the interior and compresion in the superficial portions of the sheet). Nor is the invention limited to cooling by air, but hollow plates or jackets (not shown), through which a cooling medium is circulated, may be used to better advantage because with them a more uniform cooling may be obtained.

Also, variations may be made in current, in voltage, and frequency, and as to types and arrangement of contacts or electrodes and the times and places of application. For example, the electrodes shown can be replaced by electrodes each approximately the full length of the side of the sheet, and used only on two opposite edges or on all edges. With such electrodes, flow of current through the entire width or length of the sheet may be assured. Such types and arrangements of electrodes may be preferable when cooling by natural radiation only or by radiation to flat cooling plates of known type, but also can be used with forced air cooling, if desired.

With suitably small electrodes, the current may be applied and controlled to heat a local section to a higher degree than the other portions of the sheet. The current can also be applied selectively or alternately to different portions as desired, and may be continuous, intermittent or periodic. Thus, current may be applied to electrodes 7—7 while none is allowed to flow through electrodes 8—8; or a higher potential used in one pair than in another pair of electrodes; or the potential may be varied at times or continuously throughout the tempering operation.

The intersection of paths of current in the glass sheet may serve the purpose of distributing, increasing and making more uniform the zones of temperature differential and resulting strain by creating hot spots, as indicated at 19, 20, 21 and 22, the effect of which is similar to the creation of the chilled or super-cooled spots within the circle 13. Increasing the number of zones of differential temperature while distributing them uniformly increases the degree and uniformtity of strain, and thus increases the resistance of the glass to breakage.

Other variations in the performance of my novel method may be made without departing from the scope of the appended claims.

It will be seen that my novel method provides a measure of control over the temperature differentials essential in tempering glass with the result that the tempering operation is not limited or handicapped by the rapid natural cooling which heretofore has required that the operation be completed in a minimum of time; with the result that a higher degree of strain may be obtained; the strain can be more uniformly distributed and local variations reduced; and hence the glass can be made more resistant to breakage.

Having thus described my invention, what I claim is:

1. The method of case-hardening a sheet of glass, which comprises the steps of heating the sheet to a temperature approximating its softening point and until the sheet is substantially free from strains, chilling the glass on opposite sides in predetermined areas respectively opposite one another, and locally heating the glass internally in said areas at a rate higher than that of heating other areas of the sheet not chilled as aforesaid by dissipating electrical energy locally therein to modify the temperature differential in the glass resulting from the cooling of the surfaces of said areas as aforesaid.

2. The method of case-hardening a sheet of glass which comprises initially heating the sheet to a temperature approximating its softening point and until said sheet is substantially free of strain, cooling the exterior of the sheet after the initial heating thereof is completed to establish temperature differentials therein, and further heating the sheet by conducting electric current therein through the interior thereof.

3. The method of case-hardening a sheet of glass which comprises initially heating the sheet to a temperature approximating its softening point and until said sheet is substantially free of strain, cooling the exterior of the sheet after the initial heating thereof is completed to establish temperature differentials therein, and further heating the sheet by conducting electric current through the interior thereof in predetermined spaced paths.

4. The method of case-hardening a sheet of glass which comprises initially heating the sheet to a temperature approximating its softening point and until said sheet is substantially free of strain, thereafter cooling the exterior of said sheet on opposite sides in separated opposed zones, and further heating the sheet by conducting electric current therethrough in paths passing between said zones of cooling.

5. The method of case-hardening a sheet of glass, which comprises the steps of heating the sheet to a temperature approximating its softening point and until the sheet is substantially free from strains, locally cooling a predetermined area on both surfaces of the sheet, and passing an electric current by conduction through said area of the sheet during at least a part of the cooling as aforesaid, whereby the cooling of both surfaces of the localized area of the sheet results in an effective constriction of the free passage for the electric current through that area due to the increased resistance of the relatively cool glass to the flow of the electric current, which in turn results in an increased localized heating at said area.

GEORGE E. HOWARD.